US012628255B2

(12) United States Patent
Wu

(10) Patent No.: US 12,628,255 B2
(45) Date of Patent: May 12, 2026

(54) DRIVING DEVICE AND DRIVING METHOD FOR LIGHT- EMITTING ELEMENT

(71) Applicant: Qisda Corporation, Taoyuan City (TW)

(72) Inventor: Chih-Hsiang Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 57 days.

(21) Appl. No.: 18/666,831

(22) Filed: May 17, 2024

(65) Prior Publication Data

US 2025/0008624 A1 Jan. 2, 2025

(30) Foreign Application Priority Data

Jun. 30, 2023 (CN) ........................ 202310792827.X

(51) Int. Cl.
*H05B 45/50* (2022.01)
*H05B 45/10* (2020.01)

(52) U.S. Cl.
CPC ............. *H05B 45/50* (2020.01); *H05B 45/10* (2020.01)

(58) Field of Classification Search
None
See application file for complete search history.

(56) References Cited

U.S. PATENT DOCUMENTS

2009/0189546 A1* 7/2009 Chang Chien ......... H05B 45/10 315/307
2011/0298834 A1* 12/2011 Shin ..................... G09G 3/3406 345/690
2013/0082624 A1* 4/2013 Brassfield ............ H05B 45/375 315/297
2016/0366737 A1* 12/2016 Hong ................. H05B 45/3725

* cited by examiner

*Primary Examiner* — Anh Q Tran

(57) ABSTRACT

The disclosure provides a driving device and a driving method for a light-emitting element. The driving device includes a driving circuit, a softstart circuit, and a capacitor. An output terminal of the softstart circuit is coupled to the capacitor and the driving circuit to provide a dimming voltage. A driving signal output by the driving circuit drives a light-emitting element circuit. The driving circuit is enabled or disabled based on an enabling signal. Based on a relationship between the dimming voltage and current information of the light-emitting element circuit, the driving circuit dynamically adjusts a duty cycle of the driving signal. In response to the enabling signal disabling the driving circuit, the softstart circuit pulls down an original adjustment voltage to generate a pulled-down voltage as the dimming voltage. In response to the enabling signal enabling the driving circuit, the softstart circuit pulls up the dimming voltage.

7 Claims, 10 Drawing Sheets

DRIVING DEVICE AND DRIVING METHOD FOR LIGHT- EMITTING ELEMENT

CROSS-REFERENCE TO RELATED APPLICATION

This application claims the priority benefit of China application serial no. 202310792827.X, filed on Jun. 30, 2023. The entirety of the above-mentioned patent application is hereby incorporated by reference herein and made a part of this specification.

BACKGROUND

Technical Field

The disclosure relates to an electronic circuit, and in particular, to a driving device and a driving method for a light-emitting element.

Description of Related Art

A light source of a projector develops from a single light source to a multi-color (such as red, green, blue) light source. The projector uses pulse width modulation (PWM) dimming technology to adjust a current of the light source so as to adjust brightness and color. Therefore, current stability is important for light source startup. An overshoot current often occurs when activating a light source quickly. The overshoot current often exceeds a rated current value. The overshoot current that exceeds the design value will not only reflect instability in the brightness/color of the light source, but may also burn out the light source elements.

SUMMARY

The disclosure provides a driving device and a driving method for a light-emitting element to reduce an overshoot current when activating the light-emitting element.

In an embodiment of the disclosure, the driving device includes a driving circuit, a softstart circuit, and a first capacitor. The driving circuit is adapted to output a driving signal to drive a light-emitting element circuit. The driving circuit is enabled or disabled based on an enabling signal. Based on a relationship between a dimming voltage and current information of the light-emitting element circuit, the driving circuit dynamically adjusts a duty cycle of the driving signal. An output terminal of the softstart circuit is coupled to the driving circuit to provide the dimming voltage. In response to the enabling signal disabling the driving circuit, the softstart circuit pulls down an original adjustment voltage to generate a pulled-down voltage as the dimming voltage. In response to the enabling signal enabling the driving circuit, the softstart circuit pulls up the dimming voltage. The first capacitor is coupled to the output terminal of the softstart circuit.

In an embodiment of the disclosure, the driving method includes the following steps. A driving circuit is enabled or disabled by an enabling signal. Based on a relationship between a dimming voltage and current information of a light-emitting element circuit, a duty cycle of a driving signal is dynamically adjusted by the driving circuit. An output terminal of a softstart circuit is coupled to the driving circuit to provide the dimming voltage. The driving signal is output by the driving circuit to drive the light-emitting element circuit. In response to the enabling signal disabling the driving circuit, the softstart circuit pulls down an original adjustment voltage to generate a pulled-down voltage as the dimming voltage. In response to the enabling signal enabling the driving circuit, the softstart circuit pulls up the dimming voltage. A first capacitor is coupled to the output terminal of the softstart circuit.

Based on the above, when the enabling signal disables the driving circuit, the softstart circuit generates a pulled-down voltage lower than the original adjustment voltage, and uses the pulled-down voltage as the dimming voltage provided to the driving circuit. When the enabling signal enables the driving circuit, the softstart circuit slowly pulls up the dimming voltage from a level of the pulled-down voltage to approximately a level of the original adjustment voltage. After the enabling signal enables the driving circuit, the driving circuit can dynamically adjust the duty cycle of the driving signal based on the relationship between the dimming voltage and the current information of the light-emitting element circuit, so that the current of the light-emitting element can be dynamically adjusted. During the process of enabling/activating the driving circuit, since the dimming voltage is slowly pulled up to approximately the level of the original adjustment voltage, the overshoot current of the light-emitting element can be effectively reduced when starting up the light-emitting element.

In order to make the above-mentioned features and advantages of the disclosure clearer and easier to understand, the following embodiments are given and described in details with accompanying drawings as follows.

DESCRIPTION OF THE EMBODIMENTS

Figure 1:
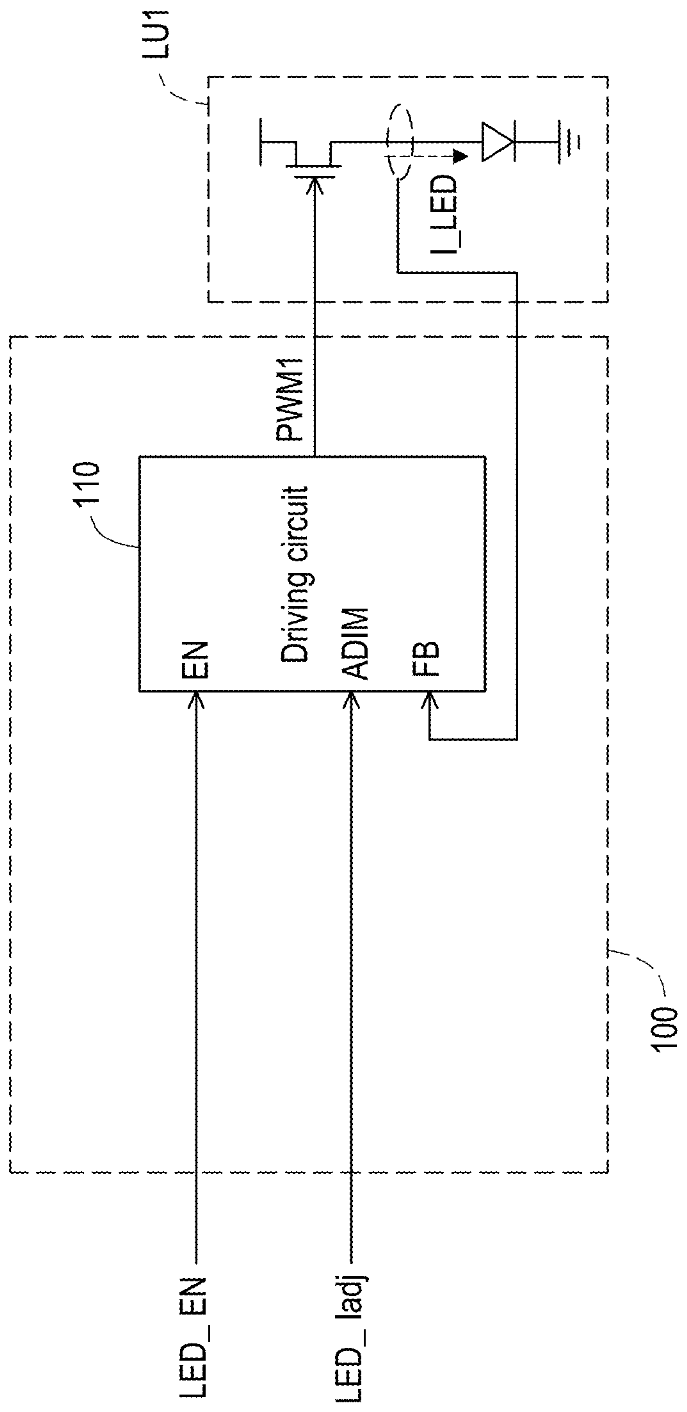
FIG. 1 is a schematic circuit block diagram of a driving device for a light-emitting element according to an embodiment.

The term "coupling (or connection)" used in this specification (including the claims) may refer to any direct or indirect connection means. For example, if a first device is coupled (or connected) to a second device, it should be interpreted as the first device being directly connected to the second device, or the first device being indirectly connected to the second device through other devices or some connection means. The terms "first" and "second" mentioned throughout this specification (including the claims) serve to name elements or to distinguish different embodiments or ranges, and not to limit the upper or lower bound of the number of elements nor to limit the sequence of elements. In addition, wherever possible, elements/components/steps using the same reference numerals in the drawings and embodiments refer to the same or similar parts. Cross-reference may be made to related descriptions for elements/components/steps using the same reference numerals or using the same terms in different embodiments.

FIG. 1 is a schematic circuit block diagram of a driving device 100 of a light-emitting element according to an embodiment. A system (a pre-stage circuit of the driving device 100, not shown) can output an enabling signal LED_EN to enable or disable the driving device 100. The driving device 100 shown in FIG. 1 includes a driving circuit 110. The system can output the enabling signal LED_EN to a start pin EN of the driving circuit 110 to enable or disable the driving circuit 110. When the enabling signal LED_EN disables the driving circuit 110, a driving signal PWM1 output by the driving circuit 110 can turn off a light-emitting element circuit LU1. The driving signal PWM1 can be a pulse width modulation (PWM) signal or other signals. When the enabling signal LED_EN enables/activates the driving circuit 110, the driving signal PWM1 output by the driving circuit 110 can light up the light-emitting element circuit LU1. Based on the actual design, the light-emitting element circuit LU1 may include one or more light-emitting elements, such as light-emitting diodes (LEDs) or other light-emitting elements.

The system can output an original adjustment voltage LED_Iadj to a dimming pin ADIM of the driving circuit 110 to control the driving circuit 110 to dim the light-emitting element circuit LU1. The light-emitting element circuit LU1 can provide current information (a signal used to represent a light-emitting element current I_LED) to a feedback pin FB of the driving circuit 110. The driving circuit 110 may compare the original adjustment voltage LED_Iadj and the current information (the light-emitting element current I_LED) of the light-emitting element circuit LU1. Based on a relationship between the original adjustment voltage LED_Iadj and the light-emitting element current I_LED of the light-emitting element circuit LU1, the driving circuit 110 can dynamically adjust a duty cycle of the driving signal PWM1. That is, the driving circuit 110 can adjust brightness of the light-emitting element circuit LU1 based on the original adjustment voltage LED_Iadj.

Figure 2:
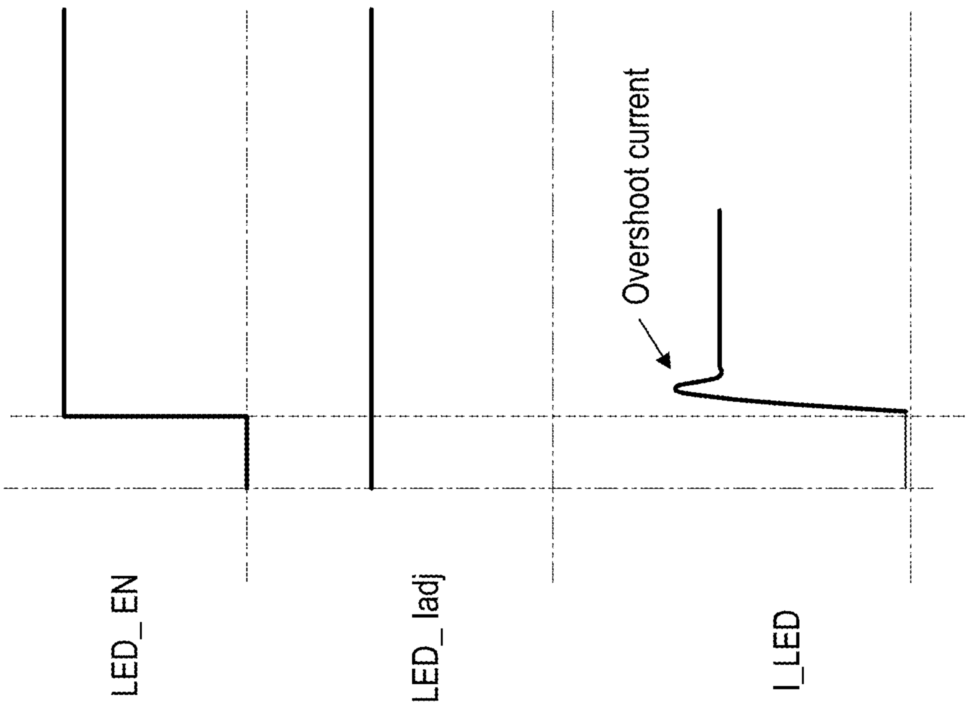
FIG. 2 is a schematic diagram of a situation in which an overshoot current occurs when a light-emitting element circuit is quickly activated according to an embodiment.

FIG. 2 is a schematic diagram of a situation in which an overshoot current occurs when a light-emitting element circuit is quickly activated according to an embodiment. FIG. 2 shows a schematic waveform diagram of the enabling signal LED_EN, the original adjustment voltage LED_Iadj, and the light-emitting element current I_LED of FIG. 1, in which the vertical axis represents voltage or current, and the horizontal axis represents time. Generally, after the user completes the brightness adjustment of the light-emitting element circuit LU1, the original adjustment voltage LED_Iadj will maintain a certain fixed level, so that the brightness of the light-emitting element circuit LU1 remains stable.

When the enabling signal LED_EN is at a low logic level, the driving circuit 110 is disabled. At this time, the driving signal PWM1 output by the driving circuit 110 can turn off the light-emitting element circuit LU1 (the light-emitting element current I_LED approaches zero). When the enabling signal LED_EN transitions to a high logic level, the enabling signal LED_EN can quickly activate the driving circuit 110. At this time, the driving signal PWM1 output by the driving circuit 110 can turn on the light-emitting element circuit LU1. The driving circuit 110 does not have a softstart control pin and cannot resolve the problem of an overshoot current. When the light-emitting element circuit LU1 is quickly activated, the light-emitting element current I_LED often causes the overshoot current. When the overshoot current exceeds a rated current value, not only will the user easily detect instability in the brightness/color of the light source, but there is also the possibility of burning out the light-emitting element.

Figure 3:
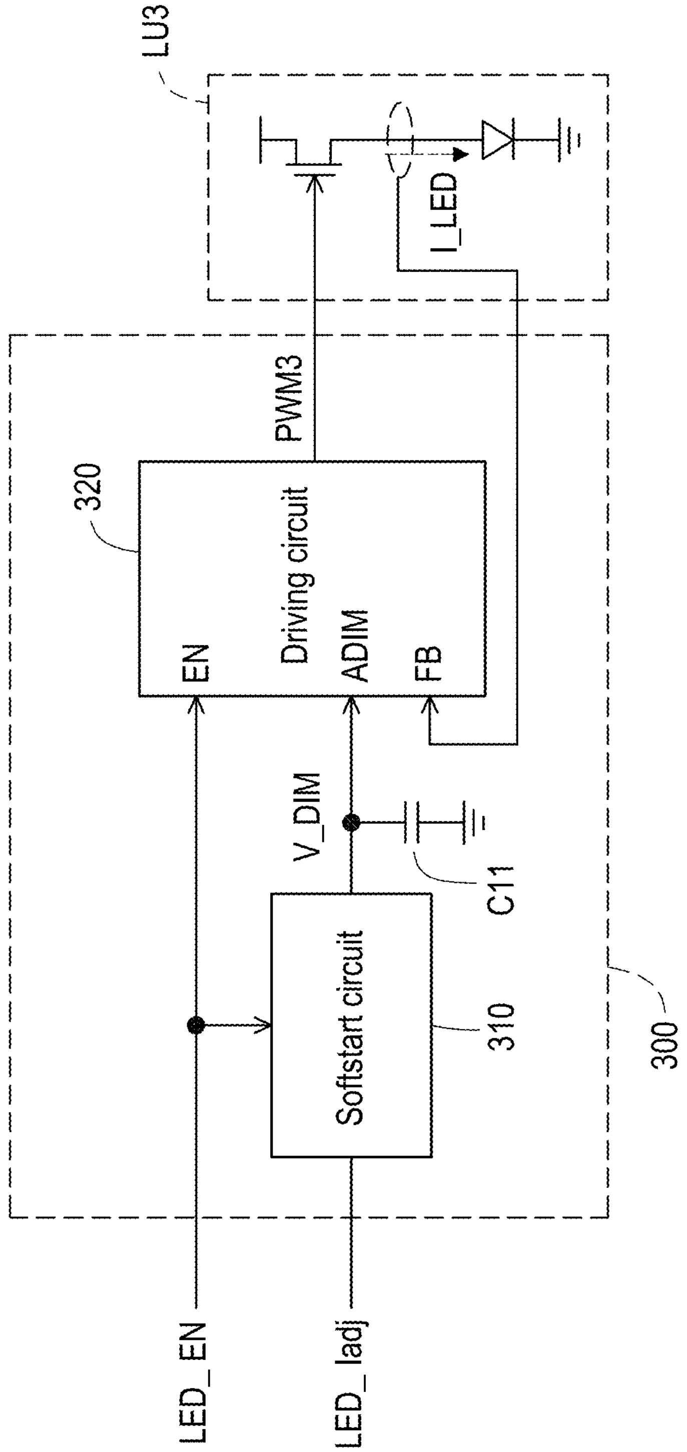
FIG. 3 is a schematic circuit block diagram of a driving device for a light-emitting element according to an embodiment of the disclosure.

FIG. 3 is a schematic circuit block diagram of a driving device 300 for a light-emitting element according to an embodiment of the disclosure. A system (a pre-stage circuit of the driving device 300, not shown) can output the enabling signal LED_EN to enable or disable the driving device 300. In addition, the system can output the original adjustment voltage LED_Iadj to control the driving device 300 to dim a light-emitting element circuit LU3. For the enabling signal LED_EN, the original adjustment voltage LED_Iadj, and the light-emitting element circuit LU3 shown in FIG. 3, reference may be made to the related descriptions of the enabling signal LED_EN, the original adjustment voltage LED_Iadj, and the light-emitting element circuit LU1 shown in FIG. 1 and details thereof are not repeated.

The driving device 300 shown in FIG. 3 includes a softstart circuit 310, a capacitor C11, and a driving circuit 320. An enabling terminal EN of the driving circuit 320 receives the enabling signal LED_EN. The driving circuit 320 is adapted to output a driving signal PWM3 to drive the light-emitting element circuit LU3. The driving signal PWM3 can be a PWM signal or other signals. When the enabling signal LED_EN disables the driving circuit 320, the driving signal PWM3 of the driving circuit 320 can turn off the light-emitting element circuit LU3. Based on the actual design, in some embodiments, for the driving circuit 320 shown in FIG. 3, reference may be made to the related description of the driving circuit 110 shown in FIG. 1, and details thereof are not repeated. Alternatively, the driving circuit 320 may include a well-known light source element driving circuit or other drivers.

An input terminal of the softstart circuit 310 receives the original adjustment voltage LED_Iadj. A detection terminal of the softstart circuit 310 receives the enabling signal LED_EN. An output terminal of the softstart circuit 310 is coupled to the capacitor C11 and the driving circuit 320 to provide a dimming voltage V_DIM. When the enabling signal LED_EN enables/activates the driving circuit 320, the driving signal PWM3 output by the driving circuit 320 can light up the light-emitting element circuit LU3. The driving circuit 320 can compare the dimming voltage V_DIM and current information of the light-emitting element circuit LU3 (a signal used to represent the light-emitting element current I_LED). Based on a relationship between the dimming voltage V_DIM and the light-emitting element current I_LED of the light-emitting element circuit LU3, the driving circuit 320 can dynamically adjust a duty cycle of the driving signal PWM3.

Figure 4:
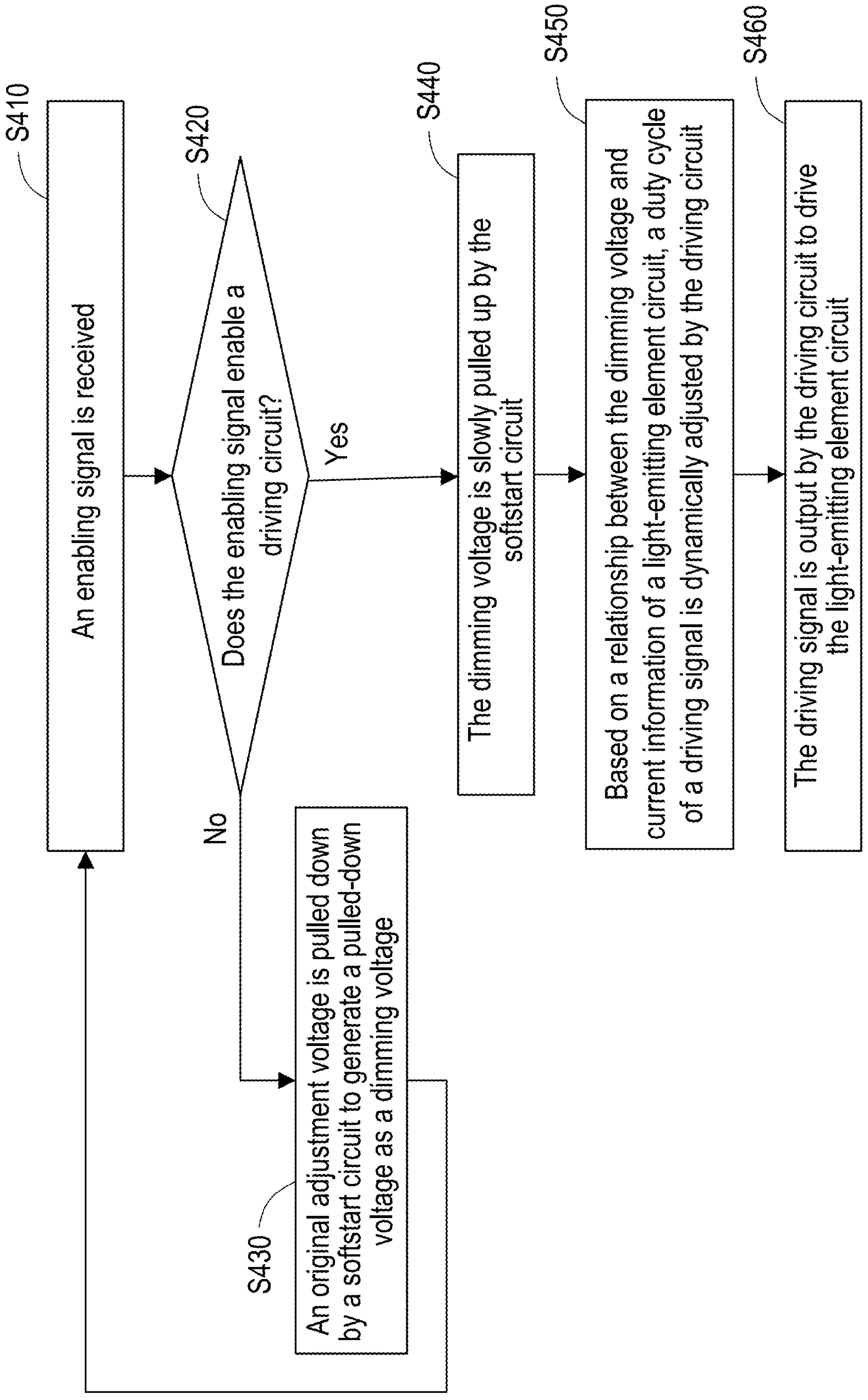
FIG. 4 is a schematic flowchart of a driving method for a light-emitting element according to an embodiment of the disclosure.

FIG. 4 is a schematic flowchart of a driving method for a light-emitting element according to an embodiment of the disclosure. Please refer to FIG. 3 and FIG. 4. In step S410, the driving device 300 receives the enabling signal LED_EN. The enabling signal LED_EN can enable or disable the driving circuit 320 (step S420). In response to the enabling signal LED_EN disabling the driving circuit 320 (the determination result in step S420 is "No"), the softstart circuit 310 can pull down the original adjustment voltage LED_Iadj to generate a pulled-down voltage as the dimming voltage V_DIM (step S430).

Figure 5:
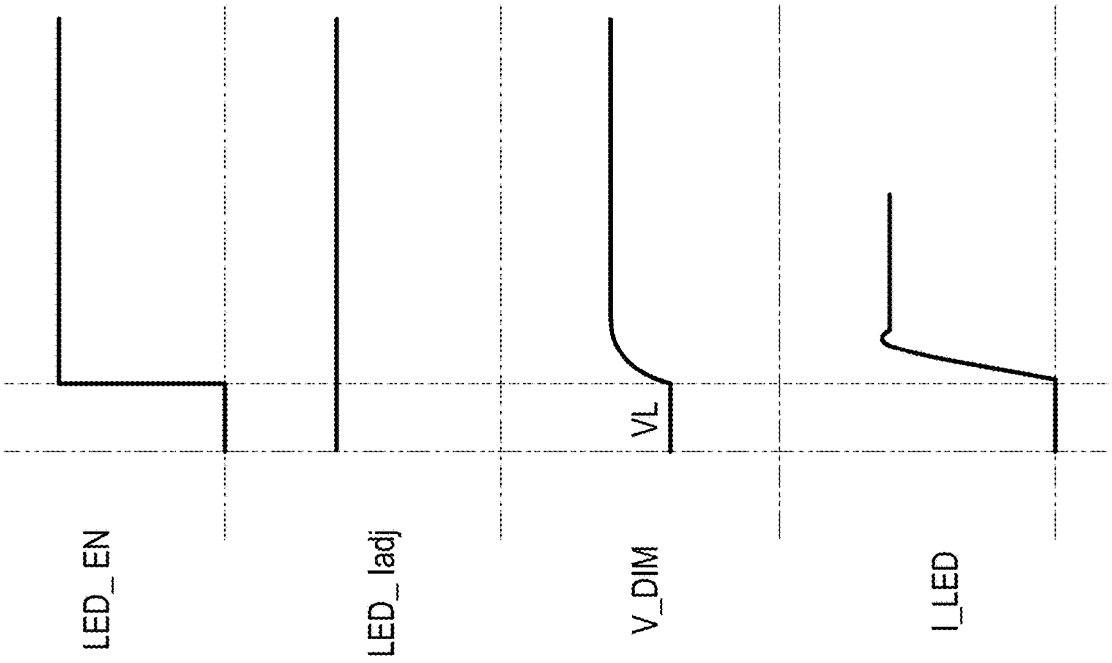
FIG. 5 is a schematic diagram of signal waveforms during a soft start of a driving circuit according to an embodiment of the disclosure.

FIG. 5 is a schematic diagram of signal waveforms during a soft start of a driving circuit according to an embodiment of the disclosure. FIG. 5 shows a schematic waveform diagram of the enabling signal LED_EN, the original adjustment voltage LED_Iadj, the dimming voltage V_DIM, and the light-emitting element current I_LED in FIG. 3, in which the vertical axis represents voltage or current, and the horizontal axis represents time. Generally, after the user completes the brightness adjustment of the light-emitting element circuit LU3, the original adjustment voltage LED_Iadj will maintain a certain fixed level so that the brightness of the light-emitting element circuit LU3 remains stable.

Please refer to FIG. 3, FIG. 4, and FIG. 5. When the enabling signal LED_EN is at a low logic level, the driving circuit 320 is disabled. In response to the enabling signal LED_EN disabling the driving circuit 320 (the determination result in step S420 is "No"), the softstart circuit 310 can pull down the original adjustment voltage LED_Iadj to generate a pulled-down voltage VL as the dimming voltage V_DIM (step S430). At this time, the driving signal PWM3 output by the driving circuit 320 can turn off the light-emitting element circuit LU3 (the light-emitting element current I_LED approaches zero).

When the enabling signal LED_EN transitions to a high logic level, the enabling signal LED_EN can quickly activate the driving circuit 320. At this time, the driving signal PWM3 output by the driving circuit 320 can turn on the light-emitting element circuit LU3. In response to the enabling signal LED_EN enabling the driving circuit 320 (the determination result of step S420 is "Yes"), the softstart circuit 310 can slowly pull up the dimming voltage V_DIM from the pulled-down voltage VL to approximately a level of the original adjustment voltage LED_Iadj (step S440). Based on the buffering of capacitor C11, the dimming voltage V_DIM is pulled up gradually (as shown in FIG. 5). Based on the relationship between the dimming voltage V_DIM and the current information of the light-emitting element circuit LU3, the driving circuit 320 can dynamically adjust the duty cycle of the driving signal PWM3 (step S450). The driving circuit 320 outputs the driving signal PWM3 to drive the light-emitting element circuit LU3 (step S460). Due to the dimming voltage V_DIM being gradually pulled up, the light-emitting element current I_LED of the light-emitting element circuit LU3 can be slowly pulled up to a target current level so as to effectively reduce the overshoot current.

To sum up, when the enabling signal LED_EN disables the driving circuit 320, the softstart circuit 310 generates a pulled-down voltage VL lower than the original adjustment voltage LED_Iadj, and uses the pulled-down voltage VL as the dimming voltage V_DIM provided to the driving circuit 320. When the enabling signal LED_EN enables the driving circuit 320, the softstart circuit 310 slowly pulls up the dimming voltage V_DIM from the level of the pulled-down voltage VL to approximately the level of the original adjustment voltage LED_Iadj. After the enabling signal LED_EN enables the driving circuit, the driving circuit 320 can dynamically adjust the duty cycle of the driving signal PWM3 based on the relationship between the dimming voltage V_DIM and the current information of the light-emitting element circuit LU3 (a signal used to represent the light-emitting element current I_LED), and then dynamically adjust the light-emitting element current I_LED. During the process of enabling/activating the driving circuit 320, since the dimming voltage V_DIM is slowly pulled up to approximately the level of the original adjustment voltage LED_Iadj, the overshoot current of the light-emitting element can be effectively reduced when activating the light-emitting element. When the overshoot current occurs in the light-emitting element current I_LED, the softstart circuit 310 can control the overshoot current within a design range that meets the element specifications.

Figure 6:
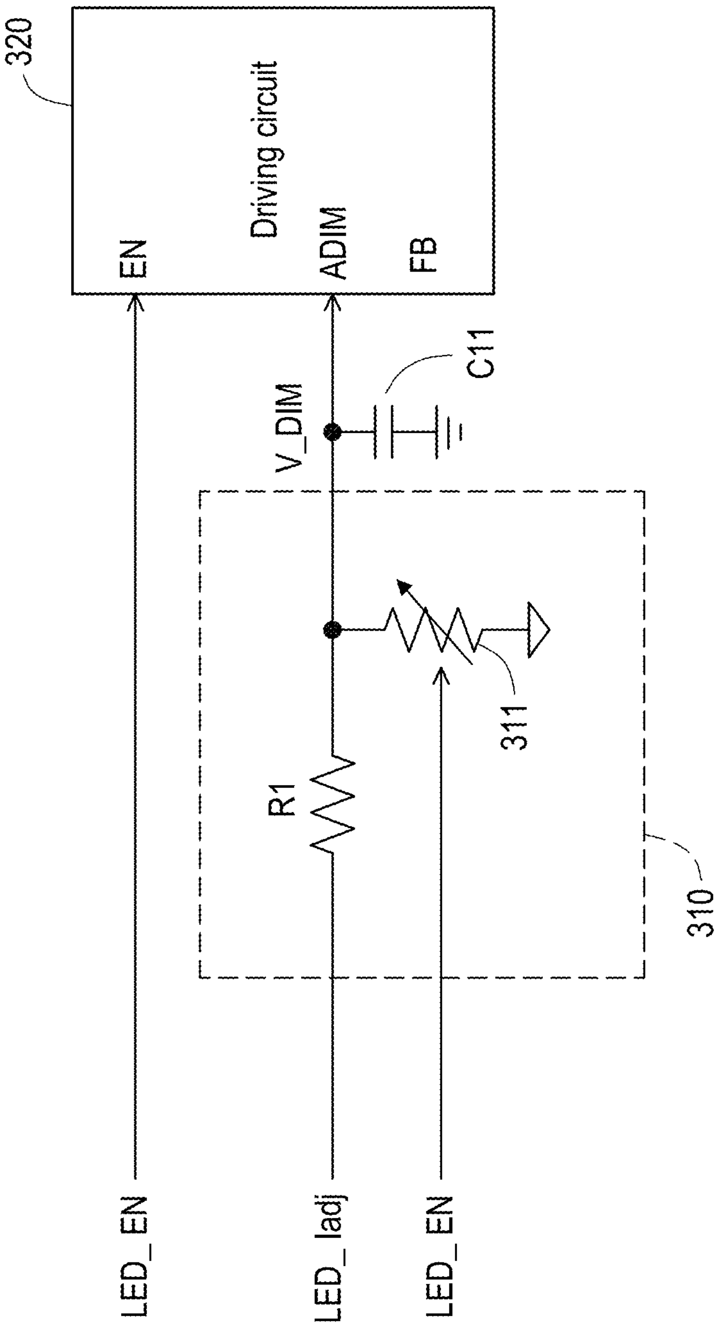
FIG. 6 is a schematic circuit block diagram of a softstart circuit according to an embodiment of the disclosure.

FIG. 6 is a schematic circuit block diagram of the softstart circuit 310 according to an embodiment of the disclosure. The softstart circuit 310 shown in FIG. 6 may be one of the many implementation examples of the softstart circuit 310 shown in FIG. 3. In the embodiment shown in FIG. 6, the softstart circuit 310 includes a resistor R1 and a variable resistor circuit 311. A first terminal of the resistor R1 is adapted to receive the original adjustment voltage LED_Iadj. A second terminal of the resistor R1 is coupled to the output terminal of the softstart circuit 310 to provide the dimming voltage V_DIM to the driving circuit 320. The variable resistor circuit 311 is coupled between the second terminal of the resistor R1 and a reference voltage (such as a ground voltage or other fixed voltages). In response to the enabling signal LED_EN disabling the driving circuit 320, the variable resistor circuit 311 can reduce a resistance of the variable resistor circuit 311. At this time, the variable resistor circuit 311 can pull down the original adjustment voltage LED_Iadj to generate the pulled-down voltage VL as the dimming voltage V_DIM. In response to the enabling signal LED_EN enabling the driving circuit 320, the variable resistor circuit 311 may increase the resistance of the variable resistor circuit 311. At this time, based on the buffering of the capacitor C11, the variable resistor circuit 311 can slowly pull up the dimming voltage V_DIM from the level of the pulled-down voltage VL to approximately the level of the original adjustment voltage LED_Iadj.

Figure 7:
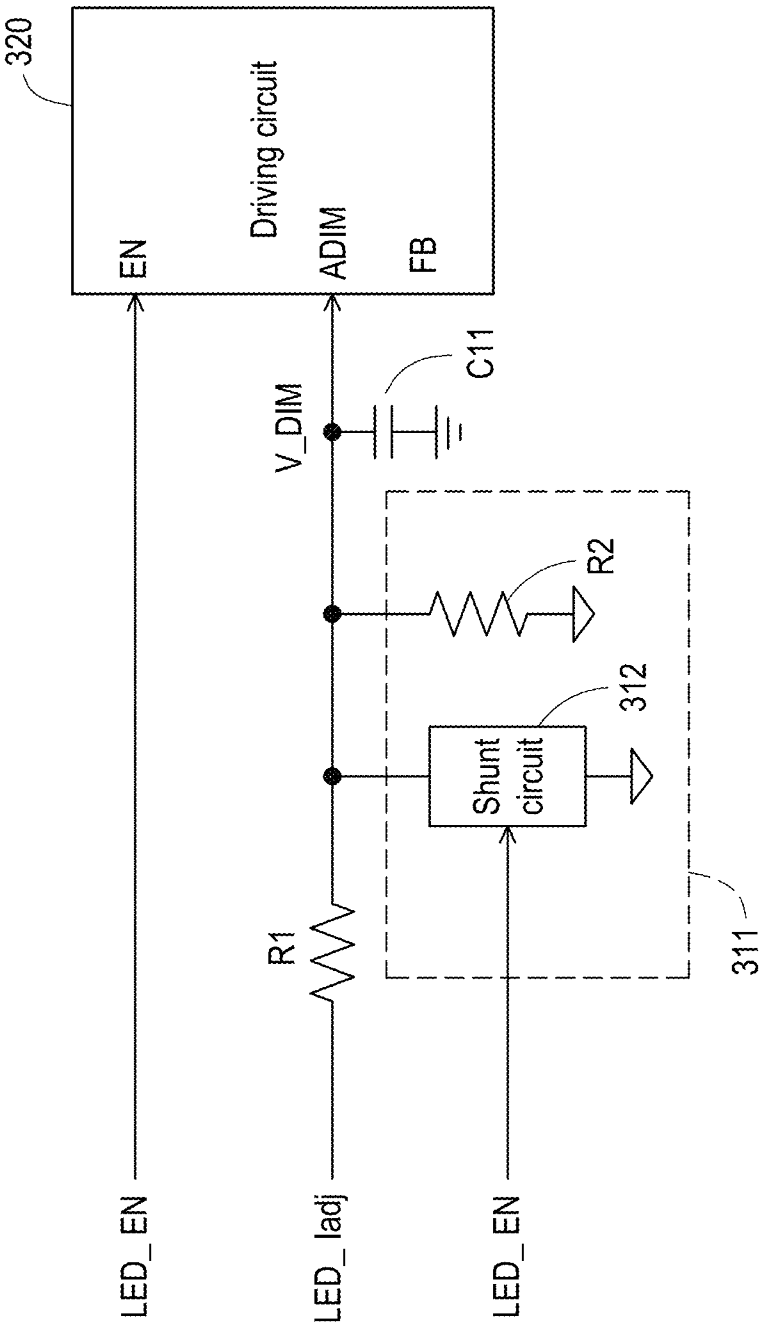
FIG. 7 is a schematic circuit block diagram of a variable resistor circuit according to an embodiment of the disclosure.

FIG. 7 is a schematic circuit block diagram of the variable resistor circuit 311 according to an embodiment of the disclosure. The variable resistor circuit 311 shown in FIG. 7 may be one of the many implementation examples of the variable resistor circuit 311 shown in FIG. 6. In the embodiment shown in FIG. 7, the variable resistor circuit 311 includes a resistor R2 and a shunt circuit 312. A first terminal of the resistor R2 is coupled to the second terminal of the resistor R1 to receive the dimming voltage V_DIM. A second terminal of the resistor R2 is coupled to a reference voltage (such as a ground voltage or other fixed voltages). The shunt circuit 312 is coupled to the second terminal of the resistor R1 to receive the dimming voltage V_DIM. In response to the enabling signal LED_EN disabling the driving circuit 320, the shunt circuit 312 may provide a shunt path to the second terminal of the resistor R1. In response to the enabling signal LED_EN enabling the driving circuit 320, the shunt circuit 312 can turn off the shunt path.

Figure 8:
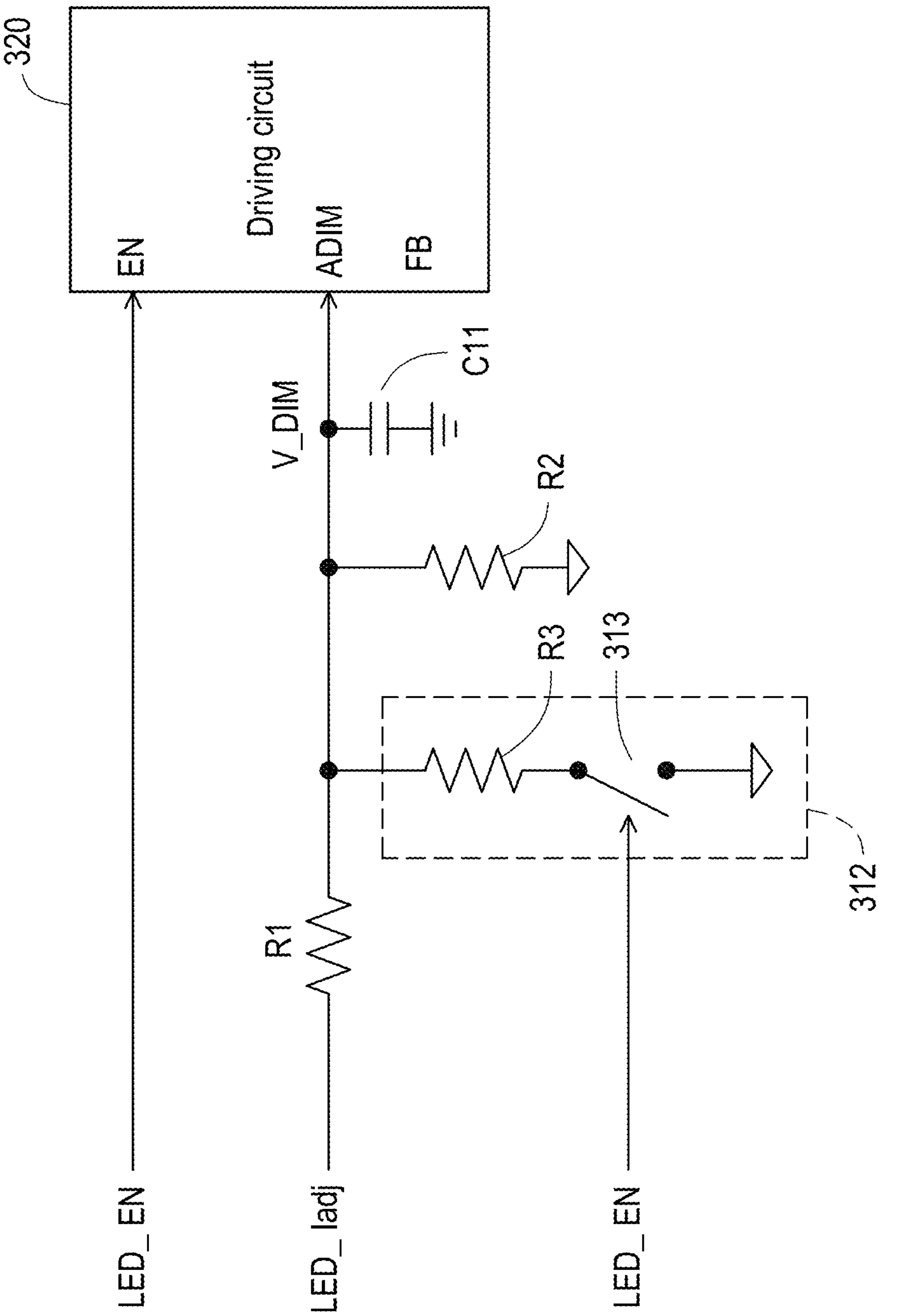
FIG. 8 is a schematic circuit block diagram of a shunt circuit according to an embodiment of the disclosure.

FIG. 8 is a schematic circuit block diagram of the shunt circuit 312 according to an embodiment of the disclosure. The shunt circuit 312 shown in FIG. 8 may be one of the many implementation examples of the shunt circuit 312 shown in FIG. 7. In the embodiment shown in FIG. 8, the shunt circuit 312 includes a resistor R3 and a switch circuit 313. A first terminal of the resistor R3 is coupled to the second terminal of the resistor R1 to receive the dimming voltage V_DIM. The switch circuit 313 is coupled between a second terminal of the resistor R3 and a reference voltage (such as a ground voltage or other fixed voltages). In response to the enabling signal LED_EN disabling the driving circuit 320, the switch circuit 313 is turned on.

Therefore, the shunt circuit 312 can provide a shunt path to the second terminal of the resistor R1. In response to the enabling signal LED_EN enabling the driving circuit 320, the switch circuit 313 is turned off. Therefore, the shunt circuit 312 can turn off the shunt path.

Figure 9:
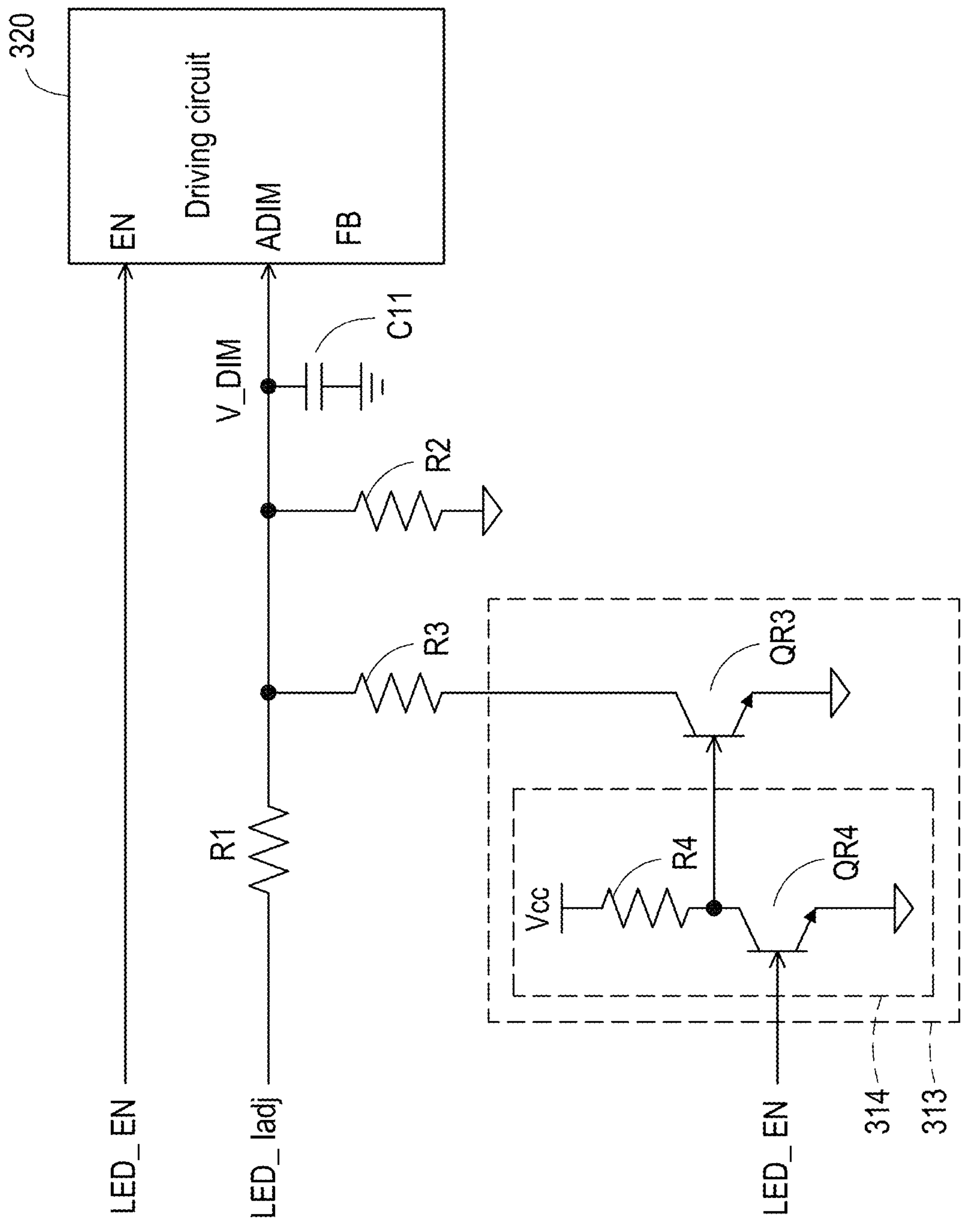
FIG. 9 is a schematic circuit block diagram of a switch circuit according to an embodiment of the disclosure.

FIG. 9 is a schematic circuit block diagram of the switch circuit 313 according to an embodiment of the disclosure. The switch circuit 313 shown in FIG. 9 may be one of the many implementation examples of the switch circuit 313 shown in FIG. 8. In the embodiment shown in FIG. 9, the switch circuit 313 includes a switch QR3 and a control circuit 314. A first terminal of the switch QR3 (for example, a collector of a transistor) is coupled to the second terminal of the resistor R3. A second terminal of switch QR3 (for example, an emitter of a transistor) is coupled to a reference voltage (for example, a ground voltage or other fixed voltages). The control circuit 314 is coupled to a control terminal of the switch QR3 (for example, a base of a transistor). In response to the enabling signal LED_EN disabling the driving circuit 320, the control circuit 314 turns on the switch QR3. In response to the enabling signal LED_EN enabling the driving circuit 320, the control circuit 314 turns off the switch QR3.

In the embodiment shown in FIG. 9, the control circuit 314 includes a resistor R4 and a switch QR4. A first terminal of the resistor R4 is coupled to a power supply voltage Vcc. A second terminal of the resistor R4 is coupled to the control terminal of the switch QR3. A first terminal of the switch QR4 (for example, a collector of a transistor) is coupled to the control terminal of the switch QR3. A second terminal of switch QR4 (for example, an emitter of a transistor) is coupled to a reference voltage (for example, a ground voltage or other fixed voltages). A control terminal of the switch QR4 (such as a base of a transistor) receives the enabling signal LED_EN. In response to the enabling signal LED_EN disabling the driving circuit 320, the switch QR4 is turned off. In response to the enabling signal LED_EN enabling the driving circuit 320, the switch QR4 is turned on.

Figure 10:
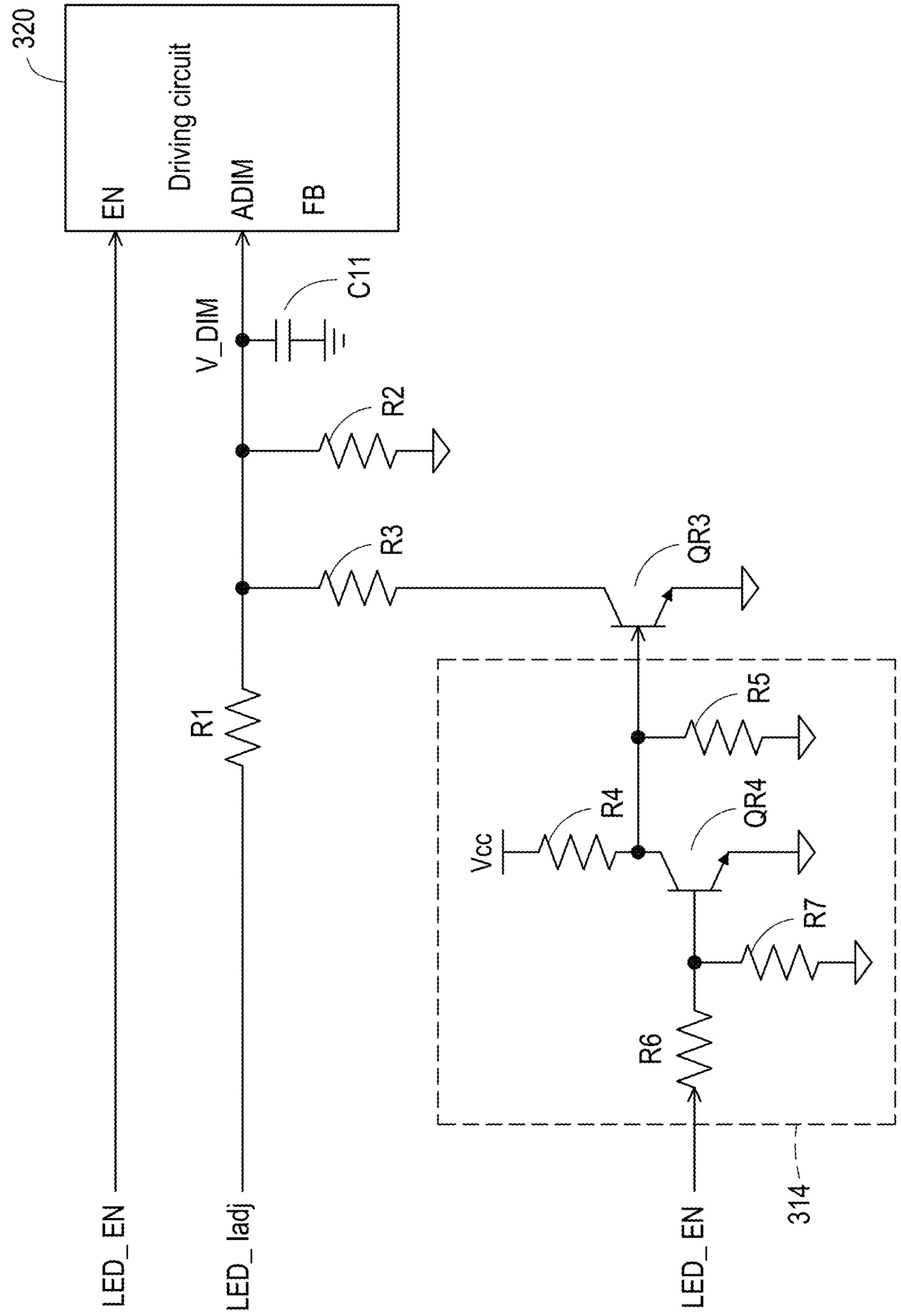
FIG. 10 is a schematic circuit diagram of a control circuit according to another embodiment of the disclosure.

FIG. 10 is a schematic circuit diagram of the control circuit 314 according to another embodiment of the disclosure. In the embodiment shown in FIG. 10, the control circuit 314 includes the resistor R4, the switch QR4, a resistor R5, a resistor R6, and a resistor R7. For the resistor R4 and the switch QR4 shown in FIG. 10, reference can be made to the related descriptions of the resistor R4 and the switch QR4 shown in FIG. 9, and details thereof are not repeated. In the embodiment shown in FIG. 10, a first terminal of the resistor R5 is coupled to the second terminal of the resistor R4. A second terminal of the resistor R5 is coupled to a reference voltage (such as a ground voltage or other fixed voltages). A first terminal of the resistor R6 is adapted to receive the enabling signal LED_EN. A second terminal of the resistor R6 is coupled to the control terminal of the switch QR4 (for example, a base of a transistor). A first terminal of the resistor R7 is coupled to the second terminal of the resistor R6. A second terminal of the resistor R7 is coupled to a reference voltage (such as a ground voltage or other fixed voltages).

When the enabling signal LED_EN is at a low logic level, the switch QR4 is not turned on, causing the power supply voltage Vcc to turn on the switch QR3. At this time, the original adjustment voltage LED_Iadj is divided by the resistors R1, R2, and R3 to generate a dimming voltage V_DIM smaller than the original adjustment voltage LED_Iadj. The dimming voltage V_DIM being pulled-down is LED_Iadj*(R3//R2)/[R1+(R3//R2)]=(LED_Iadj*R2*R3)/(R1*R2+R1*R3+R2*R3)=VL. When the enabling signal LED_EN is at a high logic level, the switch QR4 is turned on, causing the switch QR3 to not turn on. At this time, the original adjustment voltage LED_Iadj is divided by resistors R1 and R2 to pull up the dimming voltage V_DIM. The dimming voltage V_DIM being pulled up is (LED_Iadj*R2)/(R1+R2). When the switch QR3 is not turned on, the original adjustment voltage LED_Iadj can charge the capacitor C11 through the resistor R1 to slowly pull the dimming voltage V_DIM from the level of the pulled-down voltage VL to approximately the level of the original adjustment voltage LED_Iadj (as shown in FIG. 5).

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A driving device for a light-emitting element, comprising:

a driving circuit, adapted to output a driving signal to drive a light-emitting element circuit, wherein the driving circuit is enabled or disabled based on an enabling signal, and the driving circuit dynamically adjusts a duty cycle of the driving signal based on a relationship between a dimming voltage and current information of the light-emitting element circuit;

a softstart circuit, having an output terminal coupled to the driving circuit to provide the dimming voltage, wherein the softstart circuit pulls down an original adjustment voltage to generate a pulled-down voltage as the dimming voltage in response to the enabling signal disabling the driving circuit, and the softstart circuit pulls up the dimming voltage in response to the enabling signal enabling the driving circuit; and a first capacitor, coupled to the output terminal of the softstart circuit, wherein the softstart circuit comprises:

a first resistor, having a first terminal adapted to receive the original adjustment voltage, wherein a second terminal of the first resistor is coupled to the output terminal of the softstart circuit; and a variable resistor circuit, coupled between the second terminal of the first resistor and a first reference voltage, wherein the variable resistor circuit reduces a resistance of the variable resistor circuit in response to the enabling signal disabling the driving circuit, and the variable resistor circuit increases the resistance of the variable resistor circuit in response to the enabling signal enabling the driving circuit.

2. The driving device according to claim 1, wherein the variable resistor circuit comprises:

a second resistor, having a first terminal coupled to the second terminal of the first resistor, wherein a second terminal of the second resistor is coupled to the first reference voltage; and a shunt circuit, coupled to the second terminal of the first resistor, wherein the shunt circuit provides a shunt path to the second terminal of the first resistor in response to the enabling signal disabling the driving circuit, and the shunt circuit turns off the shunt path in response to the enabling signal enabling the driving circuit.

3. The driving device according to claim 2, wherein the shunt circuit comprises:

a third resistor, having a first terminal coupled to the second terminal of the first resistor; and a switch circuit, coupled between a second terminal of the third resistor and the first reference voltage, wherein the switch circuit is turned on in response to the enabling signal disabling the driving circuit, and the switch circuit is turned off in response to the enabling signal enabling the driving circuit.

4. The driving device according to claim 3, wherein the switch circuit comprises:

a first switch, having a first terminal coupled to the second terminal of the third resistor, wherein a second terminal of the first switch is coupled to the first reference voltage; and a control circuit, coupled to a control terminal of the first switch, wherein the control circuit turns on the first switch in response to the enabling signal disabling the driving circuit, and the control circuit turns off the first switch in response to the enabling signal enabling the driving circuit.

5. The driving device according to claim 4, wherein the control circuit comprises:

a fourth resistor, having a first terminal coupled to a power supply voltage, wherein a second terminal of the fourth resistor is coupled to the control terminal of the first switch; and a second switch, having a first terminal coupled to the control terminal of the first switch, wherein a second terminal of the second switch is coupled to a second reference voltage, the second switch is turned off in response to the enabling signal disabling the driving circuit, and the second switch is turned on in response to the enabling signal enabling the driving circuit.

6. The driving device according to claim 5, wherein the control circuit further comprises:

a fifth resistor, having a first terminal coupled to the second terminal of the fourth resistor, wherein a second terminal of the fifth resistor is coupled to a third reference voltage;

a sixth resistor, having a first terminal adapted to receive the enabling signal, wherein a second terminal of the sixth resistor is coupled to a control terminal of the second switch; and a seventh resistor, having a first terminal coupled to the second terminal of the sixth resistor, wherein a second terminal of the seventh resistor is coupled to a fourth reference voltage.

7. A driving method for a light-emitting element, comprising:

enabling or disabling a driving circuit by an enabling signal;

dynamically adjusting a duty cycle of a driving signal by the driving circuit based on a relationship between a dimming voltage and current information of a light-emitting element circuit, wherein an output terminal of a softstart circuit is coupled to the driving circuit to provide the dimming voltage;

outputting the driving signal by the driving circuit to drive the light-emitting element circuit;

pulling down an original adjustment voltage to generate a pulled-down voltage as the dimming voltage by the softstart circuit in response to the enabling signal disabling the driving circuit;

pulling up the dimming voltage by the softstart circuit in response to the enabling signal enabling the driving circuit, wherein a first capacitor is coupled to the output terminal of the softstart circuit;

reducing a resistance of a variable resistor circuit by the variable resistor circuit of the softstart circuit in response to the enabling signal disabling the driving circuit, wherein a first terminal of a first resistor of the softstart circuit receives the original adjustment voltage, a second terminal of the first resistor is coupled to the driving circuit to provide the dimming voltage, and the variable resistor circuit is coupled between the second terminal of the first resistor and a reference voltage; and increasing the resistance of the variable resistor circuit by the variable resistor circuit in response to the enabling signal enabling the driving circuit.

* * * * *